April 9, 1929.  G. D. HOFFMAN  1,708,622
AIR RELIEF AND VACUUM CHECK VALVE FOR STEAM RADIATORS
Filed June 6, 1924  2 Sheets-Sheet 1
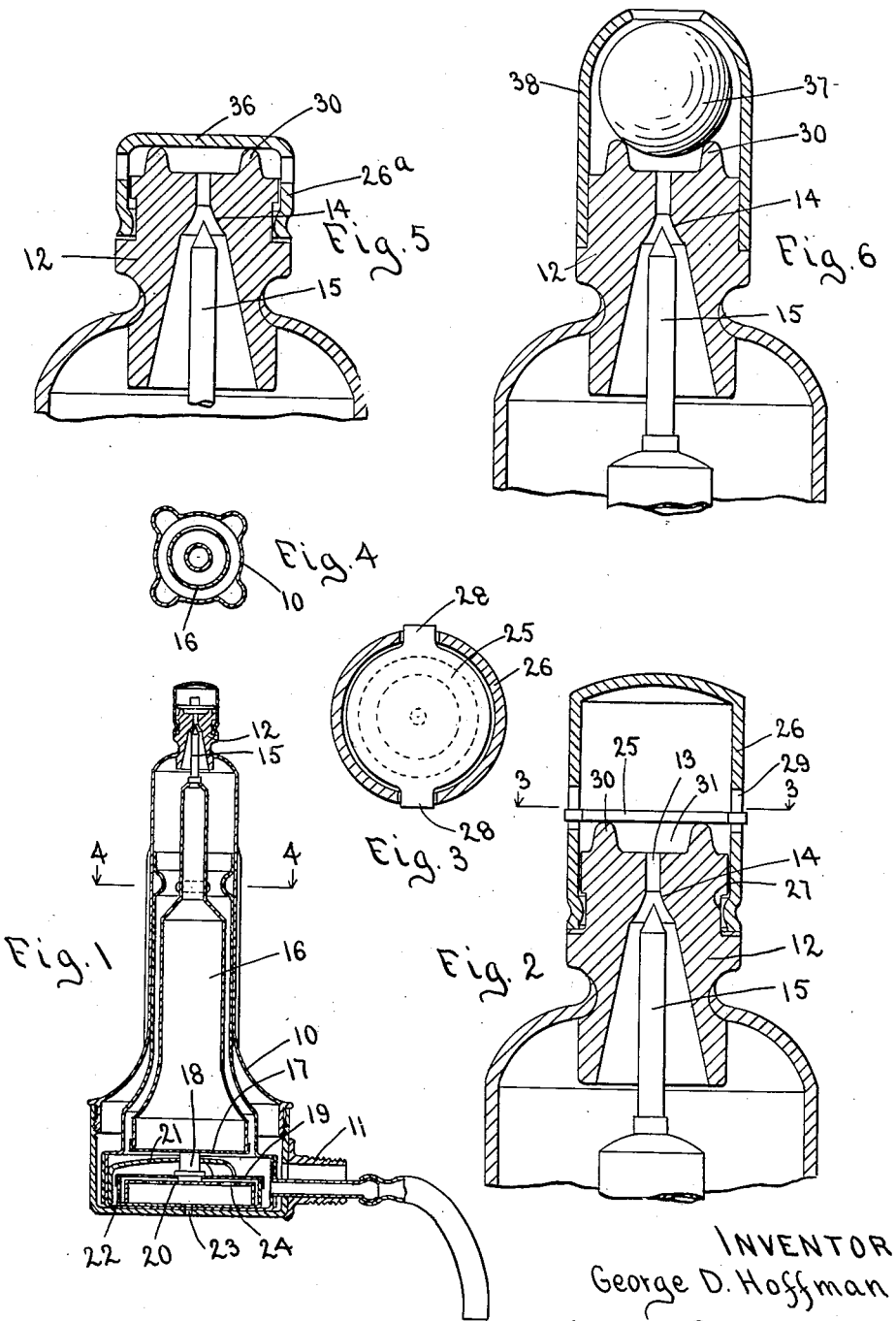
INVENTOR
George D. Hoffman
by Wright, Brown, Quinby & Hay
Att'ys April 9, 1929.　　　　G. D. HOFFMAN　　　　1,708,622
AIR RELIEF AND VACUUM CHECK VALVE FOR STEAM RADIATORS
Filed June 6, 1924　　　2 Sheets-Sheet 2

INVENTOR
George D. Hoffman
by Wright, Brown, Quinby & Tracy
att'ys

Patented Apr. 9, 1929.

1,708,622

UNITED STATES PATENT OFFICE.

GEORGE D. HOFFMAN, OF PASADENA, CALIFORNIA, ASSIGNOR TO HOFFMAN SPECIALTY COMPANY, OF WATERBURY, CONNECTICUT, A CORPORATION OF ILLINOIS.

AIR-RELIEF AND VACUUM CHECK VALVE FOR STEAM RADIATORS.

Application filed June 6, 1924. Serial No. 718,319.

This invention relates to valves provided for use with steam-heating radiators to permit free escape of air from the radiator, while preventing either escape of steam or water, or inflow of external air to the radiator in case the steam pressure of the heating system should subside below the atmospheric pressure.

In the preferred form of the invention, the valve as a whole is of the type shown in my prior patent granted March 16, 1915, No. 1,132,009; such valve containing an air vent controlled by a thermostatic float valve, and a diaphragm controlled by differences between the pressures within and outside of the radiator arranged to open the valve when the radiator pressure is above a certain point (that is, if the thermostatic valve is not then affected by the heat of the steam) and to close it when pressure in the system is below that point. The valve shown in said patent is also equipped with an adjustable spring arranged to exert pressure tending to close the valve, in order that the pressure point at which the valve would open and close might be definitely determined, and uncertainty or variable conditions due to individual variations in stiffness and flexibility of different diaphragms might be avoided.

With reference to the prior art evidenced by my prior patent aforesaid, the purpose of my present invention is to do away with the spring there shown, and to avoid the effects due to the spring, and to the normal valve-closing tendency of the diaphragm, of requiring a substantial pressure above the atmospheric pressure to be obtained in the heating system before air can be expelled, and of preventing expulsion of air when the pressure in the system is less than enough to overcome the spring and diaphragm. In more general terms, my present purpose is to permit air to be released from the radiator whenever the pressure in the system is at all higher than the atmospheric pressure, and to prevent inflow of air through the valve no matter what the pressure or vacuum in the system may be; at the same time effectively preventing escape of steam, or of both steam and water, from the valve.

These purposes or objects are accomplished by providing a check device arranged to be normally closed by gravity, or equivalent constantly acting but yielding force, and then adapted to prevent ingress of air through the valve when the external pressure is in any degree higher than that within the radiator, but so light in weight, or otherwise under such light closing pressure, that it is capable of opening under inconsiderable internal pressure; in combination with a main valve, and pressure-responsive means acting on the valve under control of the opposed pressures within and outside of the radiator.

Different forms of valves containing some of the possible embodiments of the new step made by this invention are described in the following specification, and illustrate the principles of the invention which may be embodied also in other forms.

In the drawings:

Figure 1 is a vertical sectional view of one of the forms of radiator valve above referred to;

Fig. 2 is a similar view on an enlarged scale of the upper end of the valve shown in Figure 1;

Fig. 3 is a cross section on line 3—3 of Fig. 2;

Fig. 4 is a cross section on line 4—4 of Fig. 1;

Figs. 5 and 6 are views similar to Fig. 2, but each showing a different form of check device.

Like reference characters designate like parts, and like characters modified by exponents designate equivalent parts wherever they occur in all the figures.

Figure 7:
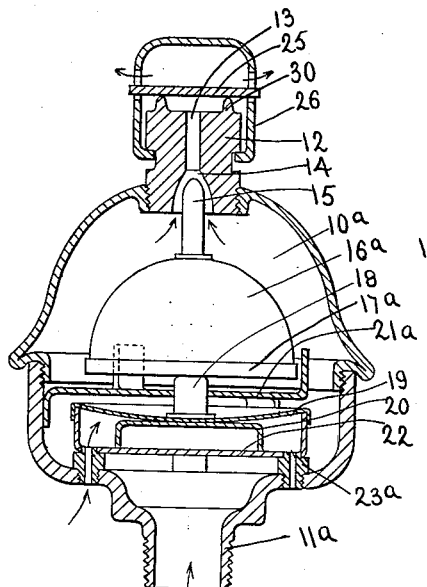
Fig. 7 is a vertical section of a valve containing equivalents, in specifically different form as to some of them, for all of the elements shown in Fig. 1.

The valve shown in Fig. 1 comprises an elongated casing 10, to the base portion of which is connected a lateral threaded nipple 11 adapted to be screwed into an orifice in a steam radiator. When properly applied to the radiator the casing occupies an upright position as shown in Fig. 1. In its upper end is secured a block 12 containing a passage 13 which forms the vent opening or outlet of the valve. Adjacent to the outer orifice of this vent opening is a valve seat 14 against which the tapered end of a valve proper or main valve 15 is adapted to seat.

The valve proper 15 is secured to the upper end of a hollow body 16 which is both a float and a thermostatic device or motor. It contains a quantity of volatile fluid designed to develop a certain desired pressure when heated to a given degree; and the bottom of the float member is formed by a flexible wall or diaphragm 17 adapted to be bulged outward by internal pressure. This bottom wall rests on a post 18 which in turn rests on a diaphragm 19, through which the post extends and in which it is sealed hermetically. The bottom end of the post rests on a supporting structure 20 when the diaphragm 19 is in its lowered position. The post 18 passes freely through a hole in a spider or frame structure 21, which serves as a guide and has legs supported by the bottom of the casing.

The diaphragm 19 is secured and sealed hermetically to the walls of a box or cup 22, the bottom of which rests on the bottom of the casing. A hole 23 passes through the adjacent bottoms of this cup and casing, and holes 24 are made in the support 20, so that the amtospheric pressure has free course to the under side of the diaphragm, but the cup and casing are otherwise sealed together so as to exclude the radiator pressure, that is the internal pressure of the valve casing, from the under side of the diaphragm. Hence the diaphragm is bulged upwardly by the occurrence of vacuum conditions within said casing. For this reason I call it the vacuum diaphragm of the valve. It is given a form or set initially which causes it to take the lowered position when the pressures on both sides are equal.

The support 20 is preferably in the form of an inverted cup fitting loosely in the diaphragm cup 22 and resting at its rim on the bottom of the latter, while its own bottom or end wall lies close beneath the diaphragm 19 and is provided with the holes 24 through which the atmospheric pressure may pass freely to the diaphragm. This support may be otherwise constructed, provided its functions are performed, of supporting the sensitive flexible diaphragm against injury by severe steam pressure on its upper side, and of providing a reaction abutment for the post 18 when the thermostatic float member is distended. The support 20 must be of sufficiently rigid construction for these purposes.

The combined length of the valve proper 15 and the buoyant thermostatic body 16, and the capacity for bulging or flexing of the diaphragm wall 17, are made of such values that, when the wall 17 is not bulged outwardly, that is, when it is in the position assumed under low temperature conditions and the posts 18 rests on the support 20, the valve proper will be unseated and the vent passage left open for escape of air from within the casing; but when the bottom wall 17 is bulged outward by high temperature conditions, the valve proper will be pressed against the seat 14 and the vent passage will be closed. The valve however is always impelled by gravity, due to its weight and that of the float member, toward its open position.

At the outer end of the vent passage is a check device or secondary valve 25 which, in the form shown in all figures except 5 and 6, is a disk positioned and guided by a cap 26. The cap loosely embraces the outer end of the block 12 and its sides are indented into a groove 27 in the block far enough to prevent accidental removal of the cap, but not to interfere wth its freedom of rotation. The disk 25 has tongues 28 at opposite sides passing through slots 29 in the walls of the cap, thereby providing connections through which the disk may be rotated by rotation of the cap; and also affording convenient means for assembling the disk and cap before applying them to the valve. The cap can thus be rotated by hand, whereby the disk also is rotated, wiping the seat and cleaning it; and the protruding ends of the tongues 28 may be grasped at the same time by the operator to press the valve against the seat while thus wiping it.

That part of the block 12 on which the disk seats is a cylindrical rib 30, the upper edge of which is in, preferably, a horizontal plane and the area which it surrounds is much greater than the orifice of the vent opening. The purpose of providing such a rib for the seat of the check disk, is to expose so large an area of the disk to the pressure within the casing, that a very low pressure will suffice to raise the disk and permit escape of air. In other words the rib encloses a chamber 31 for the collection of pressure to unseat the disk. This check device is seated or closed by gravity, and thereby offers its own weight as the only resistance to being displaced from its seat. A check disk sufficiently rigid to resist deformation even under high vacuum conditions within the valve casing, may be made light enough to be unseated by pressures of which the excess over the atmospheric pressure is inappreciable. However it is within my contemplation to arrange the check device at an inclination, or otherwise dispose it in such a manner that it offers even less resistance to opening than that indicated. When the check is raised by preponderance of internal pressure, the outflowing air finds ready escape through the slots 29 and also through the space between the loosely fitting cap and the block 12.

The same principles embodied in the valve just described may also be contained in valves of substantially different construction otherwise, and one form of such another valve is shown in Fig. 7, which will now be described. Here the casing is designated 10ª, and the nipple 11ª, by which it is connected to the radiator or pipe line, extends from its bottom. The spider or frame structure 21ª not only guides the post 18, but is also provided with guides 32 for the float, such guides being made by turning up the ends of alternate arms of the spider. The ends of the other arms are turned down to form feet 33 which support the spider in the casing. The box or cup 22, to the rim of which the vacuum diaphragm 19 is sealed, is supported in this construction, not directly upon the bottom of the casing, but upon tubular posts 23ª which are sealed in the bottom of the cup and in the bottom of the casing; and the bores of such posts provide free access of the outer air into the atmospheric chamber comprised within the vacuum diaphragm and its supporting cup 22. The combined float and thermostatic motor 16ª is of different form than the corresponding member 16 shown in Figure 1, but in other respects is like the latter. For the rest, the valve now being described is substantially identical with that first described.

Figure 9:
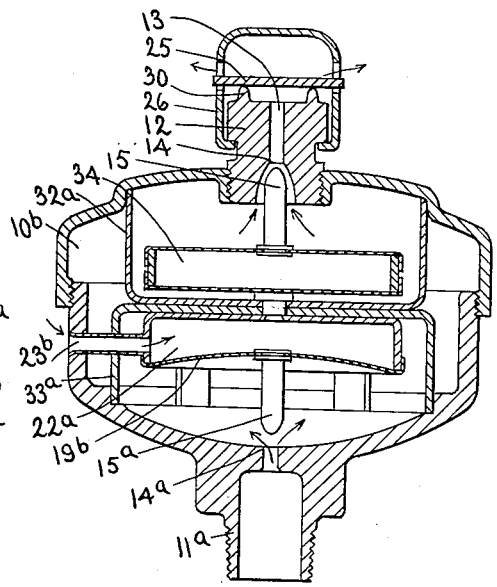
Fig. 9 is a vertical sectional view of still another form of valve containing the same principles.

It is not essential to the present invention that the effects of preventing inflow of air under high vacuum condition, and preventing escape of steam, be obtained by the same valve member; and in Figure 9 I have shown a modified form of valve in which these effects are separately obtained by two valve members or main valves. The main valve or valve proper 15 corresponds in location and movement to the valve proper so designated in the preceding figures, but it is not affected by vacuum conditions. It is supported by a thermostat 34, which may be also a float, and is constructed as a wide and shallow box with flexible top and bottom walls. It is positioned and supported by a structure 32ª resting on a support 33ª; which supporting structure may be like that shown in Figures 7 and 8, or may be otherwise constructed. A separate main valve or valve proper 15ª is arranged to seat against a seat 14ª surrounding the passage to the valve casing from the nipple, and is controlled by pressure. It is secured to the vacuum diaphragm 19ᵇ, which forms the bottom wall of the cup or box 22ª, and from which it projects downward toward the seat. The interior of box 22ª is in communication with the outer air by means of a tube 23ᵇ, said box being otherwise closed and being supported, if necessary, by the support 33ª. The initial set of the vacuum diaphragm tends to hold the valve member 15ª away from its seat, and does so whenever the internal pressure within valve casing equals or exceeds the atmospheric pressure.

Figure 10:
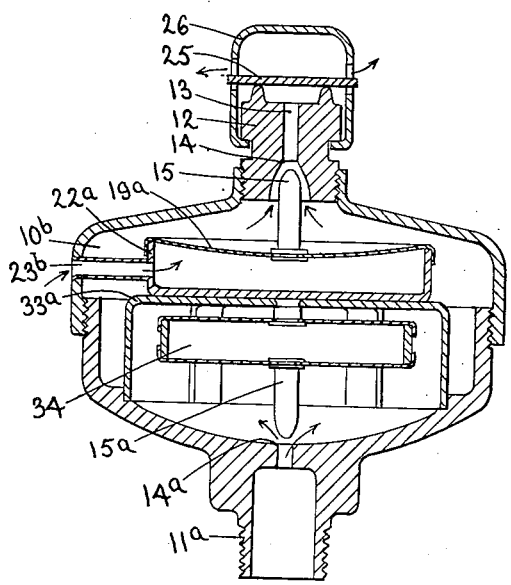
Fig. 10 is a vertical section showing a valve similar to that shown in Figure 9 but reversed as to some of its parts.

In Figure 10 the valve there shown is substantially identical with that shown in Figure 9, except that the thermostat and the vacuum diaphragm are reversed in position, the thermostat 34 being suspended from the supporting structure 33ª and in turn suspending and supporting the valve 15ª over the seat 14ª; while the vacuum diaphragm supports the valve proper 15, and the cup 22ª to which this diaphragm is secured is above the thermostat. In this figure, however, as well as in Figure 9, the ports through valve seats 14 and 14ª are both parts of one vent passage, which in these cases runs entirely through the valve casing; and the two valves 15 and 15ª are equivalent to the single valve 14 of Figures 1 and 7.

In each of Figures 7, 9 and 10 the check device is the same as already described in its construction, arrangement and cooperation with the vacuum controlled main valve or valve proper.

Instead of making the check valve as a disk loosely arranged in a cap, the cap itself may serve as the check device; as is shown in Figure 5, where the end wall 36 of the cap 26ª is located so that it may rest on the seating rib 30. Said end wall 36 is then the equivalent of the disk 25; and it may indeed be considered as a disk provided with an embracing structure which is loosely interlocked with the part 12 of the valve casing so as to prevent its accidental removal.

Figure 6 shows another form of check device consisting of a ball 37 which normally rests on the seating rib 30 and is retained by a tubular guide or cage 38 secured to the outer end of the block 12.

Figure 8:
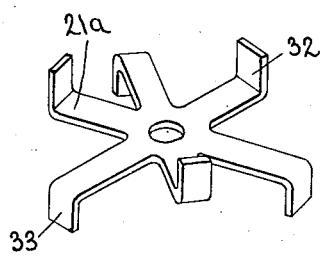
Fig. 8 is a perspective view of the guiding spider used in this form of a valve.

These and other alternative forms of check device may equally well be provided in connection with the alternative valve combinations shown in Figures 8, 9 and 10.

In describing the mode of operation of my improved valve, it will be assumed first that the radiator contains air. The temperature at the valve therefore is low and the thermostatic device is contracted. The valve proper, or main valve, 15 is in such circumstances normally open. When the pressure is raised in the radiator, either by opening the steam valve, or by generating pressure at the boiler, and as soon as the radiator pressure becomes even a slight degree higher than atmospheric, the air in the radiator displaces the check device and escapes from the vent opening. If the quantity of steam delivered or admitted to the radiator is insufficient to fill the radiator completely and at the same time satisfy the condensation capacity of the entire radiator surface, then the condensation of steam forms a partial vacuum when the air has been expelled. But, as soon as the outflow of air ceases, and before such vacuum is produced, the check valve closes against its seat and prevents any intake of air. When a sufficient vacuum has developed to cause flexing of the diaphragm 19 (or the equivalent diaphragm 19ª or 19ᵇ) the main valve is caused to close the vent passage, pressing against its seat ever more tightly as the vacuum increases.

In the case when enough steam is supplied to fill the radiator after expulsion of air and after satisfying the condensation capacity of the radiator, the main valve is closed by expansion of the flexible diaphragm 17 of the thermostatic float member 16 (Figure 1; likewise the corresponding thermostatic elements shown in Figures 7, 9 and 10) when substantially all of the air has been expelled and high temperature steam approaches the valve. When, thereafter, generation of steam ceases and condensation causes a vacuum to form in the system, the check valve, having been continuously held against its seat by gravity from the time when outflow of air ceased upon closing of the main valve, prevents air intake through the vent passage. Although the subsequent cooling of the valve causes the thermostat to contract, nevertheless the increasing vacuum causes an increasing seating pressure to be exerted on the main valve by the diaphragm 19 before contraction of the thermostat can cause unseating of the main valve. The result is the same whether the same valve is controlled by both vacuum and the thermostat, as the valve 15 in Figures 1 and 7, or whether the main valve is separated into two members, each independently controlled, as the valves 15 and 15ª in Figures 9 and 10. In any event however, when the radiator pressure, in diminishing becomes equal to the atmospheric pressure, the check device has been already closed, wherefore inflow of air through the vent cannot occur before a great enough vacuum has developed to cause closing of the valve proper, or main valve 15. Thus during the interim which occurs between commencing of vacuum conditions in the radiator and closing of the valve proper, the check device prevents any inflow of air.

On this account I have called the check device an automatic vacuum starter because its exclusion of any air from the radiator causes a vacuum to develop at once when the radiator pressure becomes less than the atmospheric pressure. The practical importance of this device in thus excluding air at the beginning is very great, for it enables the valve proper to be closed at the earliest possible moment, and thus initiate the condition which causes complete exclusion of the outer air from the radiator valve, no matter how great a degree of vacuum may ultimately occur in the system from steam condensation.

Such valves as the check devices herein described are not easily susceptible of being made leakage tight under high vacuum conditions in the radiator, owing to their light weight and consequent lack of pressure on the seating surface, their susceptibility to being jarred loose, and the liability of small bits of dirt lodging on the valve seat. While such a valve might be made initially to close tightly, it could not be depended on after having been put in service, to exclude air from the radiator under very high vacuum conditions; and the vacuum in radiators for which my valve is designed frequently becomes as great as twenty-six inches of mercury. I have found that it is impracticable to combine in one valve proper the ability to prevent inflow of air under high vacuum conditions and permit outflow of air under very low pressure conditions. Therefore I have designed the check device to prevent intake of air through the vent until such time as a vacuum has formed in the radiator sufficient to cause seating of the main valve. The vacuum for this purpose is usually less than one inch of mercury. After seating of the main valve under control of the vacuum diaphragm, continued increase in the vacuum causes progressively tighter closing of the valve, due to the large area of the vacuum diaphragm and the small area of the valve seat. I have been able with the use of the combination herein disclosed to obtain a vacuum in the radiator immediately upon the subsidence of pressure in the radiator, and to maintain a very high vacuum for a long period.

The complete exclusion of air from the radiator, thus effected, makes it possible for steam under any pressure however low, provided its temperature is above that of the surrounding air, to circulate in the heating system and radiators and deliver heat. In mild weather when only a moderate amount of heat is required from the radiators to give a comfortable room temperature, a low fire may be maintained at the boiler; and, even though the temperature then given to the water may be considerably lower than 212 degrees, yet steam (or low temperature vapor) will pass into the radiators and deliver heat. This effect would not take place if air were present in the radiators, and is due to the efficiency with which the conjoint action of the check device and the valve proper excludes air and enables vacuum conditions in the heating system to be maintained.

Another advantage of my new combination of check device with a main valve is that the check device cannot stick in closed position, due, not only to its non-wedging form, but also to the fact that before the unbalanced atmospheric pressure becomes great enough to exert any very large pressure upon it, the valve proper is closed. That is, the check device need not be made of such construction that it will prevent leakage of air under extreme vacuum conditions, and this fact enables it to be made as a flat disk or ball, or of some other form which cannot be wedged in its seat, and of material which will not stick fast to a seat. Both the check device and its seat may be made of brass or other metal suitable for the purpose.

Thus by means of my invention I have made it possible not only to prevent effectively flow of air into the radiator during vacuum conditions therein, but also to expel all of the air which may have been in the radiator when the steam pressure in the heating system is in any degree higher than the atmospheric pressure. I have avoided the necessity of a spring to ensure closing of the main valve before the radiator pressure drops below atmospheric pressure, by removing the necessity of closing the valve proper at any exact stage of the pressure drop in the radiator; and this result has been accomplished by the check device which is always closed before the diminishing radiator pressure falls below the atmospheric pressure, and so excludes the outer air until the valve proper is closed.

In regard to closing the valve to prevent escape of steam, and also to prevent escape of water, the operation of the valves herein illustrated, and particularly that shown in Fig. 1 are substantially like that illustrated in my prior Patent No. 1,132,009 hereinbefore referred to, and in another prior patent of mine No. 1,211,314, to both of which reference is directed for explanation of details shown in the present drawings but not herein described.

What I claim and desire to secure by Letters Patent is:

1. In a radiator valve a casing having a vent, an outwardly closing valve proper for said vent, thermostatic means associated with said valve proper for closing it when the temperature within the valve casing is above a certain degree, a diaphragm exposed on one side to the atmospheric pressure only and on the other side to the internal pressure in the casing, tending to permit opening of said valve and arranged to close the valve proper by preponderance of atmospheric pressure over said internal pressure, and an inwardly closing check device arranged over said vent opening in a relation causing it to be normally closed when the internal pressure is equal to or lower than the external pressure.

2. In a radiator valve a casing having a vent, an outwardly closing valve proper for said vent, thermostatic means associated with said valve proper for closing it when the temperature within the valve casing is above a certain degree, a diaphragm exposed on one side to the atmospheric pressure only and on the other side to the internal pressure in the casing, arranged to close the valve proper by preponderance of atmospheric pressure over said internal pressure and tending to enable said valve to be opened when such pressures are equal, and an inwardly closing check device arranged over said vent opening, and arranged to be closed by gravity when the internal pressure does not exceed the external pressure.

3. In a radiator valve the combination with a casing having a vent opening, of a light and easily displaced check device normally seated over said opening and arranged to be pressed against its seat by excess of atmospheric pressure over the pressure within the casing, a main valve arranged to open and close said vent, and a flexible diaphragm arranged to operate said valve with inherent tendency to permit opening of the valve, and being exposed upon opposite sides to the outer atmospheric pressure and to the pressure within the casing, respectively; said diaphragm and the main valve being so arranged that excess of outer atmospheric pressure over internal pressure tends to seat the valve.

4. In a radiator valve the combination with a casing having a vent opening, of a main valve arranged to open and close said vent, a diaphragm exposed on one side to the outer atmospheric pressure and on the opposite side to the pressure within the casing, and arranged to apply the atmospheric pressure to said valve in the closing direction, said diaphragm being normally at rest when said valve is open and being adapted to close the valve only when the external atmospheric pressure exceeds the internal pressure, and a check valve normally seated over said vent opening in relation thereto enabling it to be displaced by outflowing air.

5. An air relief valve for steam radiators comprising a casing having a vent, a valve within the casing adapted to open and close said vent, a diaphragm arranged to actuate said valve to that end, said diaphragm being exposed on opposite sides to the pressures inside and outside of the casing and, when in its normal position of rest, permitting the valve to be opened, said diaphragm being displaceable from such position to close the valve only when the external pressure exceeds the internal pressure, and a vacuum check valve normally seated by gravity over said vent, whereby it prevents inflow of air from the commencement of vacuum conditions in the valve casing, such check valve being so lightly loaded that it is displaceable by an inconsiderable excess of internal pressure over external pressure.

6. An air relief valve for steam radiators comprising a casing having a passageway through it opening respectively to the radiator and to the outer air, a main valve cooperating with a seat in said passageway, a check device cooperating with another seat in the passageway, and a diaphragm exposed on opposite sides respectively to the outer atmospheric pressure and to the pressure within the casing, arranged to exert force tending to permit opening of the valve when such pressures are equal and to transmit the external pressure to the main valve in the closing direction; said check device being normally seated and being arranged to be forced by the external pressure against its seat.

7. A radiator valve as set forth in claim 6 in which the area of the valve seat for the check device is substantially larger than the area of the valve seat for the main valve.

8. A radiator valve as set forth in claim 6 in which the area of the operating diaphragm is substantially larger than the area of the main valve seat.

9. A radiator valve as set forth in claim 6 in which the area of the space surrounded by the seat for the check device approximates the area of said check device, and is substantially larger than the area surrounded by the main valve seat; and the area of the operating diaphragm is substantially larger than that surrounded by the main valve seat.

10. A relief valve comprising a casing having an outlet passage with valve seats, valves cooperating with said seats to open and close said passage, one of said valves being normally closed when the external pressure is equal to and above the internal pressure, and being pressed toward its seat by the external pressure but openable by slight excess of internal over external pressure, and pressure-responsive means acted on oppositely by the external and internal pressures for causing closing engagement between the other valve and its seat when the external pressure exceeds the internal pressure but tending to permit separation between said valve and seat when the internal pressure is equal to and greater than the external pressure.

11. A relief valve comprising a casing having an outlet passage provided with valve seats, a plurality of valves cooperating with said seats for opening and closing said passage, one of said valves being a tightly closable valve, and pressure actuated means controlling the approach and separation between said valve and its seat and tending constantly to permit opening of the valve, and exposed to the internal pressure in the casing and to the external fluid pressure in opposition to one another, whereby an excess of external over internal pressure sufficient to overcome the opening tendency of said means is necessary and effective to effect closing engagement between the valve and its seat; the other valve being normally closed under light closing pressure and adapted to be opened by small excess of internal over external pressure, and serving to exclude inflow to the casing of external fluid under an excess pressure less than sufficient to cause closing of the first named valve.

12. An air relief valve for steam heating systems comprising a casing having a vent passage provided with valve seats, a valve proper cooperating with one of said seats to open and close said passage, pressure responsive means on which the pressure within and the pressure outside of the casing act in opposition to one another, cooperating with said valve proper and normally tending to assume a position for separation between said valve and its seat, but arranged to effect closing engagement thereof when the external pressure overcomes said opening tendency, and a check device normally closed, and under closing tendency by excess of external over internal pressure, but adapted to be opened by minute excess of internal over external pressure.

13. An air relief valve for steam heating systems comprising a casing having a vent passage for relief of air, a normally closed check device arranged to be opened by minute excess of internal pressure over external pressure, and capable of excluding external air under vacuum conditions in the system until a sufficient vacuum has developed to close the after mentioned main valve, a main valve proper constructed to close tightly said passage, and means for applying to said valve proper, in opposition to one another, the pressure in the heating system and the external atmospheric pressure, said means tending to assume a position enabling said valve proper to be opened when the internal and external pressures are substantially equal, and tending to close it only when the external exceeds the internal pressure.

14. An air relief valve for steam heating systems comprising a casing having a vent passage, a plurality of valves arranged to seat across said passage and operable to open and close the same, one of said valves being light in weight, and having a relatively large area exposed to the internal pressure of the system within its seat, and being of a material and construction to prevent sticking to its seat, said valve being normally closed and under closing pressure by the external atmosphere when the pressure thereof exceeds the internal steam or vapor pressure of the system; the seat for the other valve enclosing a substantially smaller area than the said exposed area of the first valve, and a pressure responsive device associated with the last named valve for causing closing engagement or enabling saparation between said valve and its seat, exposed oppositely to the internal and external pressures over areas substantially larger than that enclosed within the second named valve seat, and being under tendency to assume the position wherein it enables the associated valve to be opened.

In testimony whereof I have affixed my signature.

GEORGE D. HOFFMAN.